Patented Oct. 21, 1930

1,779,229

UNITED STATES PATENT OFFICE

AUGUST FRICKE, OF BERLIN, GERMANY, ASSIGNOR TO THE FIRM HAWENTA-PLATTEN-GESELLSCHAFT M. B. H., OF BERLIN, GERMANY

PROCESS OF PRODUCING WELL-ADHERING COATINGS ON ASBESTOS-CEMENT-SLATE PLATES

No Drawing. Application filed May 4, 1929, Serial No. 360,612, and in Germany July 15, 1927.

This invention relates to a process of producing well adhering coatings on asbestos-cement-slate plates, i. e., plates composed of a mixture of asbestos, Portland cement and slate.

Processes for the production of color patterned plates used for covering walls have become known. A coating is produced on the plates consisting of marble cement or similar masses, and on this coating the coloring substances are applied by means of atomizers. The blown on coloring substance is subsequently treated by planing and smoothing.

It has further become known to use a plate of cement and asbestos as support for paintings, and to treat the plates with acids, water and oils prior to the application of the paint, in order to fill their pores.

This invention relates to a different manner of producing specially well adhering coatings on asbestos-cement-slate plates.

The invention consists in grinding the plates on the front side, in opening the pores for instance by means of a wire brush, and to apply directly after the opening of the pores a coating in any desired known manner whereupon this coating may be polished.

The polished surface does not become dull even under the influence of great heat, and the color coating will not peel off nor absorb moisture. The appearance of the covering will not be spoiled, even when the plates are touched by fire.

The production of articles according to the new process is simple and economical and varies as, according to requirement, the appearance of various materials as wood, cloth, marble, leather and the like can be imitated on the ground side of the plate.

The process is carried out as follows: A set asbestos-cement-slate plate is ground, the pores are opened for instance by treating the surface of the plate with a wire brush, the dust from grinding is removed from the open pores for instance by beating and a coating of coloring substance is then applied upon the ground porous surface for instance by means of a paint atomizer a syringe or the like.

To free the pores from dust the plate is preferably heated prior to the beating, if the heat produced at the grinding should not be strong enough. The painted plate is allowed to cool and dry, and can subsequently be brightly polished with a polishing paste. The paint or coloring substance penetrates, owing to the open pores, into the asbestos-cement-slate plate and combines solidly with the same so that it is impossible that the color coating peels off or is scratched off.

The decorated plates may be used for covering walls and for other purposes. The plates prepared according to the invention withstand the most different influences, for instance of fire, frost, moisture and the like neither the asbestos-cement-slate alone nor the coating mass alone being capable to withstand these influences.

I claim:

A process of producing well adhering coatings on asbestos-cement-slate plates in roughening the latter, consisting in grinding the plates on the front side, in opening the pores by means of a wire brush, and in applying on the front side a coating of any kind in any suitable manner.

In testimony whereof I affix my signature.

AUGUST FRICKE.